United States Patent [19]

Matthews

[11] 4,328,673

[45] May 11, 1982

[54] GEOTHERMAL PUMP DUAL CYCLE SYSTEM

[75] Inventor: Hugh B. Matthews, Boylston, Mass.

[73] Assignee: Sperry Corporation, New York, N.Y.

[21] Appl. No.: 180,744

[22] Filed: Aug. 25, 1980

[51] Int. Cl.[3] .............................................. F03G 7/00
[52] U.S. Cl. ................................................ 60/641.4
[58] Field of Search ............... 60/641.4; 417/366, 379, 417/405

[56] References Cited

U.S. PATENT DOCUMENTS 4,077,220 3/1978 Matthews ........................... 60/641.4
4,142,108 2/1979 Matthews ........................... 60/641.4

Primary Examiner—Allen M. Ostrager
Attorney, Agent, or Firm—Howard P. Terry

[57] ABSTRACT

Geothermal deep well energy extraction apparatus is provided of the general kind in which solute-bearing hot water is pumped to the earth's surface from a subterranean location by utilizing thermal energy extracted from the hot water for operating a primary turbine-motor for driving a primary electrical generator at the earth's surface, the solute-bearing water being returned by a reinjection well. A surface-located auxiliary turbine-pump combination with both turbine and brine pump elements acting in series with down-well counterparts to furnish the pressure necessary for reinjection of the brine.

5 Claims, 2 Drawing Figures

GEOTHERMAL PUMP DUAL CYCLE SYSTEM

BACKGROUND OF THE INVENTION

1. Field of the Invention

The invention relates generally to efficient means for the generation of electrical power by utilizing energy from subterranean geothermal sources and, more particularly, relates to novel arrangements for application in deep, hot water wells for the beneficial extraction of thermal energy at the earth's surface.

2. Description of the Prior Art

Generally related geothermal power generation systems have been particularly discussed in several U.S. patents assigned to Sperry Corporation including:

H. B. Matthews—U.S. Pat. No. 3,824,793 for "Geothermal Energy System and Method", issued July 23, 1974;

H. B. Matthews—U.S. Pat. No. 3,989,020 for "Geothermal Energy System and Method", issued Aug. 5, 1975;

R. Govindarajan, J. L. Lobach, K. E. Nichols—U.S. Pat. No. 3,905,196 for "Geothermal Energy Pump Thrust Balance Apparatus", issued Sept. 16, 1975;

J. L. Lobach—U.S. Pat. No. 3,908,380 for "Geothermal Energy Turbine and Well System", issued Sept. 30, 1975;

H. B. Matthews—U.S. Pat. No. 3,910,050 for "Geothermal Energy System and Control Apparatus", issued Oct. 7, 1975;

H. B. Matthews—U.S. Pat. No. 3,938,334 for "Geothermal Energy Control System and Method", issued Feb. 17, 1976;

H. B. Matthews—U.S. Pat. No. 3,939,659 for "Geothermal Energy System Fluid Filter and Control Apparatus", issued Feb. 24, 1976; and K. E. Nichols—U.S. Pat. No. 3,961,866 for "Geothermal Energy System Heat Exchanger and Control Apparatus" issued June 8, 1976.

Systems of the foregoing patents may be improved by use of the present invention as will be further discussed in this specification; in general, the prior systems comprise geothermal energy recovery apparatus making use of thermal energy stored by subterranean heat sources in hot, solute-bearing well water to generate vapor or superheated fluid from a surface-injected flow of a clean working liquid; heated fluid is then used to operate a turbine-driven pump within the well for pumping the hot brine at high pressure and always in liquid state to the earth's surface, where it transfers its heat in a binary, closed-loop, heat-exchanger turbine-alternator combination for generation of electrical power. Residual brine is pumped back into the earth, while the clean, cooled working liquid is condensed at the surface-located system and is returned continuously to the deep well pumping system for generating working vapor.

SUMMARY OF THE INVENTION

The present invention is an improved geothermal energy extraction system that recovers thermal energy stored in hot solute-bearing well water to generate a super-heated fluid from a flow of working fluid. The super-heated working fluid is used to drive a turbine-driven pump at the geothermal well bottom for pumping hot brine, always in liquid state, to the earth's surface. In the present invention, the working fluid exhaust from the down-well turbine-motor is beneficially returned to the earth's surface, where it drives an auxiliary vapor turbine-motor for operating auxiliary surface equipment, such as a brine pump coupled in series with the down-well brine pump, a working fluid pump for feeding condensate to the down-well heat exchanger, and other auxiliary equipment such as an electrical generator for powering certain pumps and condenser cooling fans, for example. Other advantages accrue, as will be further discussed.

DESCRIPTION OF THE PREFERRED EMBODIMENTS

Figure 1:
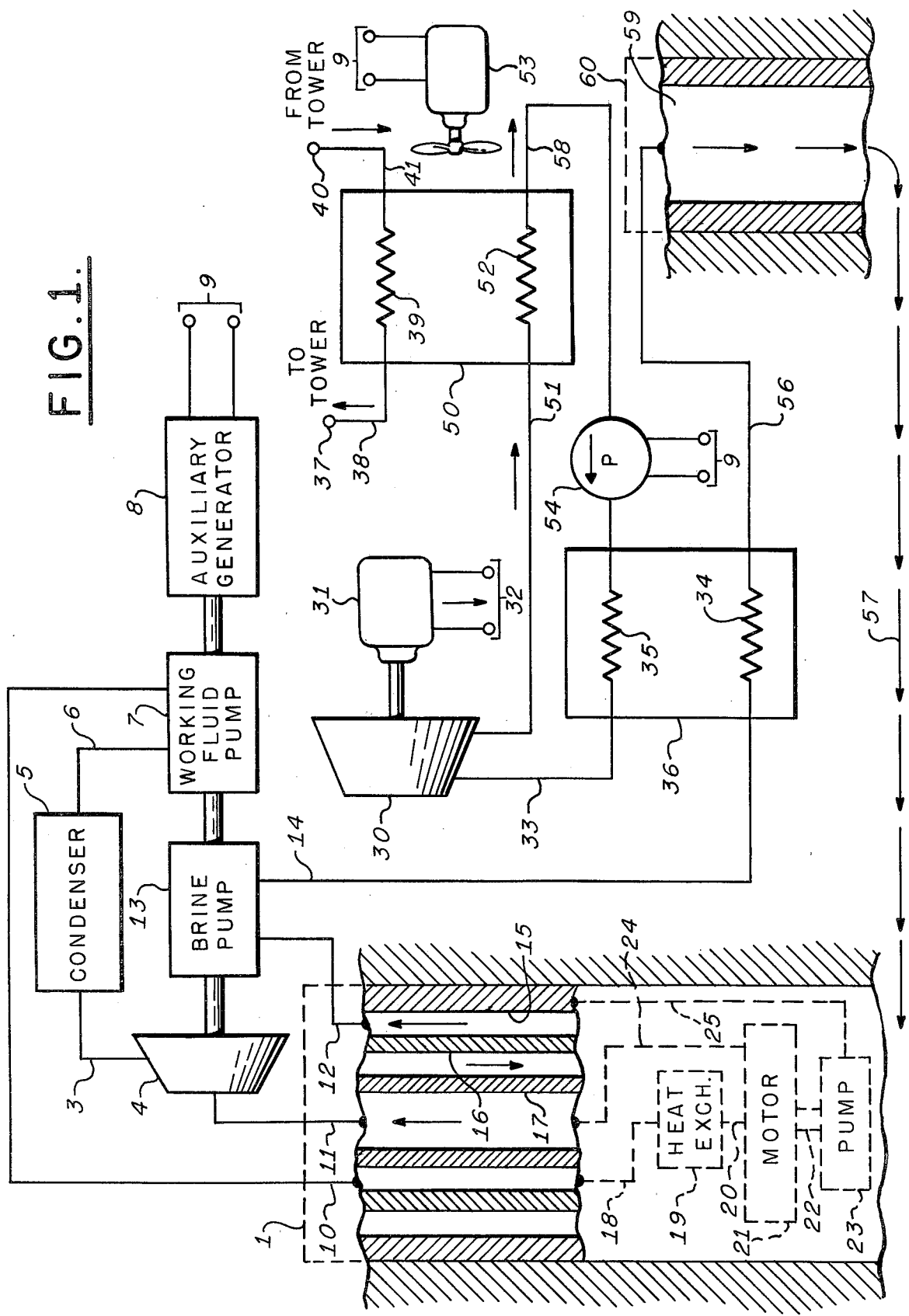
FIG. 1 is an elevation view, partly in cross-section, of the deep well geothermal energy conversion system and of cooperating surface-located control and power generation apparatus.

FIG. 1 illustrates one embodiment of the novel geothermal energy extraction system as being composed of three major subsystems. The first or geothermal well subsystem extends from its well head 1 located adjacent the earth's surface for a distance far below that surface into a region in which a copious supply of extremely hot water or brine under high pressure is naturally available. An active turbine motor 21 and a brine pump 23 are located on a common shaft 22 adjacent the hot water reservoir within a conventional well casing 15 for operation in the manner generally described in the aforementioned Matthews U.S. Pat. Nos. 3,824,793 and 3,910,050 and elsewhere. In such prior art systems, a working fluid such as a halocarbon fluid is turned to vapor or superheated fluid deep within the well in a vapor generator or heat exchanger, such as in heat exchanger 19, being heated by the flow of hot brine past it within well casing 15. In the prior art, the turbine-motor exhaust flows from the turbine motor 21 via a particular conduit analogous to conduit 24, 17 to the earth's surface; there, it is condensed and is returned in liquid form by a separate conduit to a heat exchanging vapor or superheated fluid generator such as heat exchanger 19.

In the present invention, however, direct and efficient use is made of thermal energy remaining in the working fluid exhaust vapor from the down-well turbine-motor 21 and ascending in inner conduit 17 and its extension 11; the exhaust vapor flows through the extension 11 of conduit 17 directly into the high pressure input stage of an auxiliary turbine 4, arranged to supply power for the operation of auxiliary equipment associated with the surface-located apparatus. This is in contrast to the function of the main power turbine 30 of FIG. 1 whose purpose is to drive a primary electrical power generator 31 for distribution of electrical power from terminals 32 for commercial purposes, for example.

Auxiliary turbine 4 drives a surface brine pump 13 coupled to the extension 12 of the brine conduit formed between well casing 15 and intermediate well conduit 16. Brine pump 13 supplements the operation of the down-well brine pump 23 in supplying a copious supply of hot brine through conduits 25, 15, 12 for surface use, as will be further discussed.

On the same shaft with brine pump 13 is a working fluid pump 7. Pump 7 returns the working fluid output of condenser 5 in conduit 6 via conduit 10 to the passage between conduits 16, 17 where it again flows downward through conduit 18 into the down-well heat exchanger 19, but after it is condensed to its liquid state within condenser 5.

On the same shaft with the surface-located brine pump 13 is the auxiliary electrical generator 8. The outputs on terminals 9 of generator 8 are used to provide power for operation of auxiliary surface equipment around the surface power plant. For example, if air cooling is used within condensers 5 or 50, power from generator 8 may be employed to supply the air flow. For instance, air cooling may be supplied within condenser 50 or within the water cooling tower connected to it via conduits 38, 41. Lighting and fluid pumps, such as working fluid pump 54, may also be coupled to terminals 9 of auxiliary generator 8.

A second subsystem of the present invention in the form of a brine reinjection well 59 also extends from a location 60 at the earth's surface into deep earth strata, which reinjection well may be horizontally spaced from the aforementioned hot brine source. Further apparatus at the earth's surface forms a third subsystem and cooperates with the geothermal and reinjection well system according to the present invention, as is illustrated in FIG. 1. It will be understood that an objective of the invention is to generate large quantities of electrical power at terminals 32 at the earth's surface using the conventional main fluid turbine 30 driving the primary electrical power generator 30. For this purpose, hot brine is pumped to the earth's surface by the geothermal well pump 23, being fed by well casing 15 and its conduit extension 12 through surface pump 13 to element 34 of a conventional boiler-heat exchanger device 36. Apparatus 36 is a conventional closed tank-like device designed to exchange heat between conventional heat exchanger elements 34 and 35 located therein. Elements 34 and 35 may take the forms of lineal or coiled pipes exchanging thermal energy by direct thermal conduction through their metal walls or through a suitable fluid disposed in the well known manner about them. The well pump 23 and the surface brine pump 13 force the hot brine upward through the annular region between well casing 15 and conduit 16 and then conduit 14 and its thermal content is a significant source of heat for supply to the input element 34 of device 36. As in the aforementioned Matthews patents, the brine passing through element 34 also passes through conduit 56 after having been dropped in temperature within heat exchanger 36 and is then fed through a pump, if needed, and conduit 56 into reinjection well 59. Thus, the dissolved mineral salts pumped to the surface in the hot brine are returned harmlessly into the ground at reinjection well 59. The residual brine and residual heat stored in it are thus recirculated, as indicated generally by path 57, and the brine is reheated in the subterranean geothermal zone for further recycling by down-well pump 23. One surface plant may, according to the present invention, utilize several production or reinjection wells.

A second heat exchanger element 35 in the conventional heat exchanger 36 is coupled through conduit 33 to the high pressure vapor input of turbine 30. Exhaust vapor from power turbine 30 is fed through conduit 51 to the input heat exchanger element 52 of a conventional condenser 50. Within condenser element 52, the flow of spent vapor is condensed by the conventional action of coolant flowing through a second exchanger element 39 through the cooperation of a conventional cooling tower, not shown but connected at terminals 37, 40 of the respective conduits 38, 41. Condensed working fluid is pumped through conduit 58 by pump 54 through heat exchanger element 35, and then as a working vapor or superheated fluid through conduit 33 to the input stage of the main power turbine 30.

Figure 2:
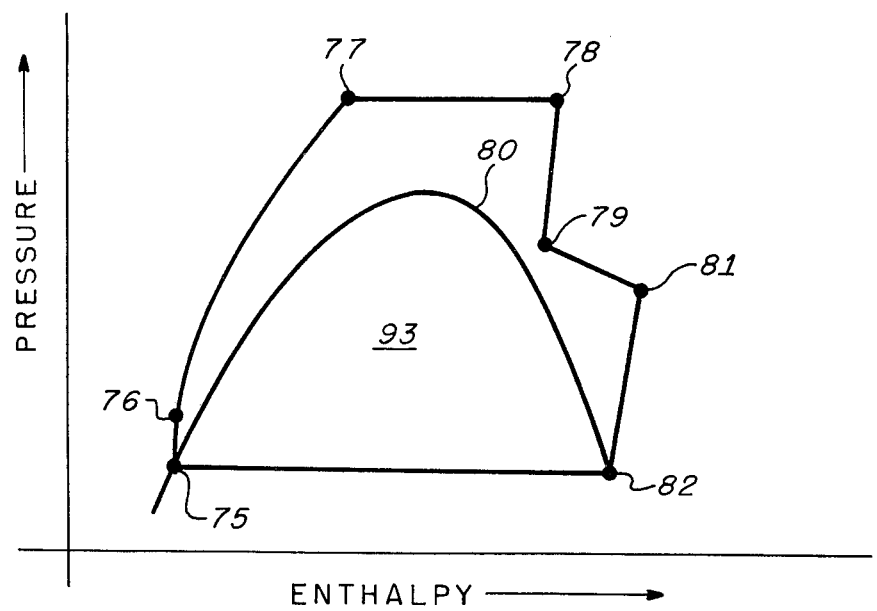
FIG. 2 is a graph useful in explaining the operation of the invention.

While operation of the invention will be understood from the foregoing description, the thermodynamic curves of FIG. 2 are also useful in understanding the invention, a pressure-enthalpy relation being illustrated. The generally constant enthalpy line 75–76 represents a slight increase in pressure resulting from work performed by the working fluid pump 7. As the working fluid descends in the well between conduits 16 and 17, both pressure and enthalpy increase, as represented by the curved line 76 to 77. The fluid is pressurized because of gravity effects, heat is extracted from the rising exhaust vapor from the down-well turbine-motor 21, and there is a potential energy exchange into enthalpy. A generally constant pressure regime is indicated by the horizontal line 77 to 78; the effect of heat extracted from the rising brine in the down-well heat exchanger 19 is represented, as well as some gravity pressurizing and a small potential energy-to-enthalpy exchange. As the working fluid expands in the down-well turbine motor 21, pressure drops significantly with a small decrease in enthalpy as represented by line 78 to 79. As the vapor exhausts from turbine-motor 21, it ascends toward the surface in the central conduit 17; during the ascent, the vapor is reheated by the hot brine, as represented by line 79 to 81 with some enthalpy being transferred into potential energy. The falling line 81 to 82 represents primarily the fall in pressure occurring as the rising working fluid further expands in performing useful work within the auxiliary surface turbine 13. The cycle is completed by a drop in enthalpy along the generally constant pressure line 82 to 75, representing the action of condenser 5. The area 93 bounded by curve 80 defines the dual phase region of the organic working fluid of the driving loop.

It will be seen that the invention has further advantages stemming from the use of the surface-located auxiliary turbine-pump combination with both turbine and brine pump elements acting in series with their down-well counterparts to furnish the pressurizing necessary for reinjection of the brine. The auxiliary surface turbine 4 is usefully employed in driving the series brine pump 13, the working fluid pump 7, the auxiliary electrical generator 8, and other auxiliary equipment. By splitting the required pumping effort between the two series brine pumping units, the working fluid in the form of the rising exhaust vapor within conduit 17 is many times as dense as it would be with all of the brine pumping work being done by the down-well brine pump 23. This characteristic permits the use of a significantly smaller diameter riser conduit 17 and therefore permits the use of smaller diameter, less expensive well casing, a matter of considerable economic impact, especially for deep wells. Also, greater flexibility of control over the process may now be effected, since it is now possible to operate conventional adjustable nozzles in the auxiliary surface turbine for control purposes. Additionally, replacement of a surface turbine or of a brine pump becomes possible when they are badly matched to well conditions.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. Geothermal deep well energy extraction apparatus of the kind in which solute-bearing water is pumped to a first station at the earth's surface from a subterranean second station by utilizing thermal energy extracted from said solute-bearing water for operating primary turbine-motor means for driving primary electrical generator means at said first station, said solute-bearing water being returned from said first station into reinjection well means, said extraction means additionally including:

working fluid generator means at said second station utilizing said thermal energy for supplying a first working fluid for driving subterranean turbine-motor means for driving subterranean pump means for pumping said solute-bearing water from said second to said first station, said working fluid generator means being heated by said solute-bearing water at said second station; and secondary turbine-motor means driving secondary electrical generator means at said first station and responsive to the exhaust of said subterranean turbine-motor means of said subterranean pump means, said secondary turbine-motor means additionally driving surface-located working fluid pump means for pumping the exhaust, after condensation, of said secndary turbine-motor means into said second station vapor generator means, said secondary turbine-motor means additionally driving surface-located brine pump means operating in cooperative series connection between said subterranean pump means and reinjection well means, said subterranean pump means, said surface located brine pump means, said secondary turbine-motor means, and said surface-located fluid pump means cooperatively substantially increasing the density of said rising exhaust from said subterranean turbine-motor means.

2. Apparatus as described in claim 1 additionally including heat exchanger means having a first heat exchanger element coupled between the output of said surface-located brine-pump means and said reinjection well means.

3. Apparatus as described in claim 2 wherein said heat exchanger means includes a second heat exchanger element for generating a second working fluid for driving said primary turbine-motor means.

4. Apparatus as described in claim 3 additionally including condenser means coupled to the exhaust of said primary turbine-motor means for condensing the exhaust thereof, and means for returning the said condenser exhaust to second heat exchanger element.

5. Apparatus as described in claim 1 wherein said extraction means further includes:

central conduit means coupling said subterranean turbine-motor exhaust to said input stage of said secondary turbine-motor means, intermediate conduit means, generally concentric about said central conduit means, coupling the output of said surface-located working fluid pump means to said second station working fluid vapor generator means, and outer conduit means, generally concentric about said intermediate conduit means, coupling the output of said subterranean pump means to the input of said surface-located brine pump means.

* * * * *